United States Patent
Premutico

(10) Patent No.: US 7,076,528 B2
(45) Date of Patent: Jul. 11, 2006

(54) SYSTEM AND METHOD FOR COMMUNICATING MESSAGES BETWEEN A HOST COMPUTER AND A DESIGNATED DEVICE

(75) Inventor: Mauro Premutico, Brooklyn, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 756 days.

(21) Appl. No.: 09/902,876

(22) Filed: Jul. 11, 2001

(65) Prior Publication Data

US 2003/0014492 A1    Jan. 16, 2003

(51) Int. Cl.
*G06F 15/16* (2006.01)

(52) U.S. Cl. .................. 709/206; 709/207; 709/203; 709/245; 709/246

(58) Field of Classification Search ........ 709/203–207, 709/223–225, 232, 238–246, 248; 704/275; 707/104, 10; 455/412.1
See application file for complete search history.

(56) References Cited

U.S. PATENT DOCUMENTS

| | | | |
|---|---|---|---|
| 5,706,211 A | 1/1998 | Beletic et al. | 364/514 R |
| 5,745,689 A | 4/1998 | Yeager et al. | 395/200.36 |
| 5,819,284 A | 10/1998 | Farber et al. | 707/104 |
| 5,838,252 A | 11/1998 | Kikinis | 340/825.44 |
| 5,956,521 A * | 9/1999 | Wang | 710/35 |
| 5,978,837 A | 11/1999 | Foladare et al. | 709/207 |
| 5,995,597 A * | 11/1999 | Woltz et al. | 379/93.24 |
| 6,018,762 A | 1/2000 | Brunson et al. | 709/206 |
| 6,023,700 A | 2/2000 | Owens et al. | 707/10 |
| 6,052,563 A | 4/2000 | Macko | 455/38.2 |
| 6,138,146 A | 10/2000 | Moon et al. | 709/206 |
| 6,219,694 B1 * | 4/2001 | Lazaridis et al. | 709/206 |
| 6,701,378 B1 * | 3/2004 | Gilhuly et al. | 709/249 |
| 6,779,022 B1 * | 8/2004 | Horstmann et al. | 709/206 |
| 6,792,085 B1 * | 9/2004 | Rigaldies et al. | 379/88.13 |
| 2002/0099775 A1 * | 7/2002 | Gupta et al. | 709/205 |

FOREIGN PATENT DOCUMENTS

| | | |
|---|---|---|
| EP | O772327 A2 | 5/1997 |
| JP | 9305155 A | 11/1997 |
| WO | WO97/33421 | 9/1997 |
| WO | WO 97/33421 * | 9/1997 |

* cited by examiner

*Primary Examiner*—Saleh Najjar
*Assistant Examiner*—Asad Muhammad Nawaz
(74) *Attorney, Agent, or Firm*—Amin & Turocy, LLP

(57) ABSTRACT

The present invention relates to an improved system and method for an automated electronic messaging system employing at least one host computer and at least one designated device, such as a mobile device. A forwarding agent sends a message from the host computer to the designated device. The designated device receives the forwarded message, sends a response message directly to a recipient and sends a copy message, which is associated with the response message, to the host computer. The response message is configured using an address associated with the host computer.

44 Claims, 4 Drawing Sheets

SYSTEM AND METHOD FOR COMMUNICATING MESSAGES BETWEEN A HOST COMPUTER AND A DESIGNATED DEVICE

FIELD OF USE

This invention relates to an improved system and method for an automated electronic messaging system employing at least one host computer and at least one designated device, such as a mobile device. More specifically, this invention relates to an automated messaging system which may employ a designated device that receives messages originally sent to a host computer and sends response messages directly from the designated device.

BACKGROUND OF THE INVENTION

It is desirable to communicate messages originally sent to a host computer to a designated device and allow a user to send a response message from the designated device. The designated device may be a laptop computer, desktop computer, a personal digital assistant or any other type of electronic communications appliance, e.g., cellular telephone, pager or wearable computer device. Such systems allow the user to receive and send messages regardless of whether the user is near the host computer.

Present systems and methods allow a host computer to replicate information to a user's mobile device by storing the information at the host computer and "synchronizing" the host computer and the mobile device. In these systems and methods the mobile device is typically placed in an interface cradle that that is electrically connected to the host computer. The connection may be a local, dedicated communication, such as a serial cable or an infrared or other type of wireless link. The host computer transmits the information for storage in the memory of the mobile device. These types of systems only maintain the same data items after a user-initiated command sequence that causes the mobile device to download the information from the host device.

Another system and method that allows the transfer of communication between a host computer and a mobile device is described in U.S. Pat. No. 6,219,694 to Lazaridis et al. The Lazaridis '694 patent describes a system and method in which a redirector program operating at the host system enables the user to redirect certain user-selected data items from the host computer to the user's mobile device upon detecting that a triggering event has occurred. Once an event has triggered redirection of the user data, the host computer then repackages these items. When the user replies to the message, software operating at the mobile device adds an outer envelope to the response message to cause the message to be routed first to the user's host computer, which then removes the outer envelope and redirects the message to the final destination.

SUMMARY OF THE INVENTION

It is the object of the present invention to provide an improved system and method for communicating messages between a host computer and a designated device, such as a mobile device.

It is a further object of the present invention to provide an improved system and method for a user to receive a message on a host computer from a sender and to communicate a response message from a designated device, such as a mobile device.

It is a further object of the present invention to provide an improved system and method for a user to send a response message directly to a recipient from a designated device wherein the user appears to have a single email account.

It is a further object of the present invention to provide an improved system and method for a user to manage an email account on a host computer that organizes messages sent by the host computer or a designated device.

The present invention provides a designated device that receives messages originally sent to a host computer by one or more senders and the designated device sends response messages directly from the designated device. The designated device may be a mobile computer that communicates with a wide area network or a local area network. Alternatively, the designated device may be a desktop computer at a remote location. In one preferred embodiment, the host computer has access to a program for forwarding certain messages to the designated device. The messages that are forwarded to the designated device are repackaged by repackaging software so the routing information that appears on the designated device is the same as the routing information that appears on the host computer. For example, the "from" line of the message that appears on the designated device would not be the address or name associated with the host computer but the address or name of the original sender of the message. The repackaging software can be stored by the host computer, the designated device or on some remote storage facility that is accessible to the host computer or designated device.

A response message can be sent directly from the designated device to a recipient or recipients. The response message may be a reply message where the recipient is the original sender's computer. The response message may be a forwarding message where the recipient is a computer not involved in the original message. In addition, these response messages could include a carbon copy or blind carbon copy to another computer. The response message appears on the recipient's computer as though the response message was sent directly from the host computer. In addition to sending the response message to the recipient's computer, a copy of the response message is communicated from the designated device to the host computer or in an alternative embodiment, it can be stored in a designated "folder" and associated with the original incoming message as received, reviewed and replied to. The communication of the copy message from the designated device to the host computer is preferably transparent to the recipient. For example, the copy message can be sent from the designated device to the host computer in a form commonly referred to as a "blind carbon copy". The repackaging software may repackage the copy message received by the host computer from the designated device. For example, the "to" line of the copy message received by the host computer may be repackaged to indicate that the message was sent to the recipient's computer (instead of the host computer).

DESCRIPTION OF THE PREFERRED EMBODIMENT

Figure 1:
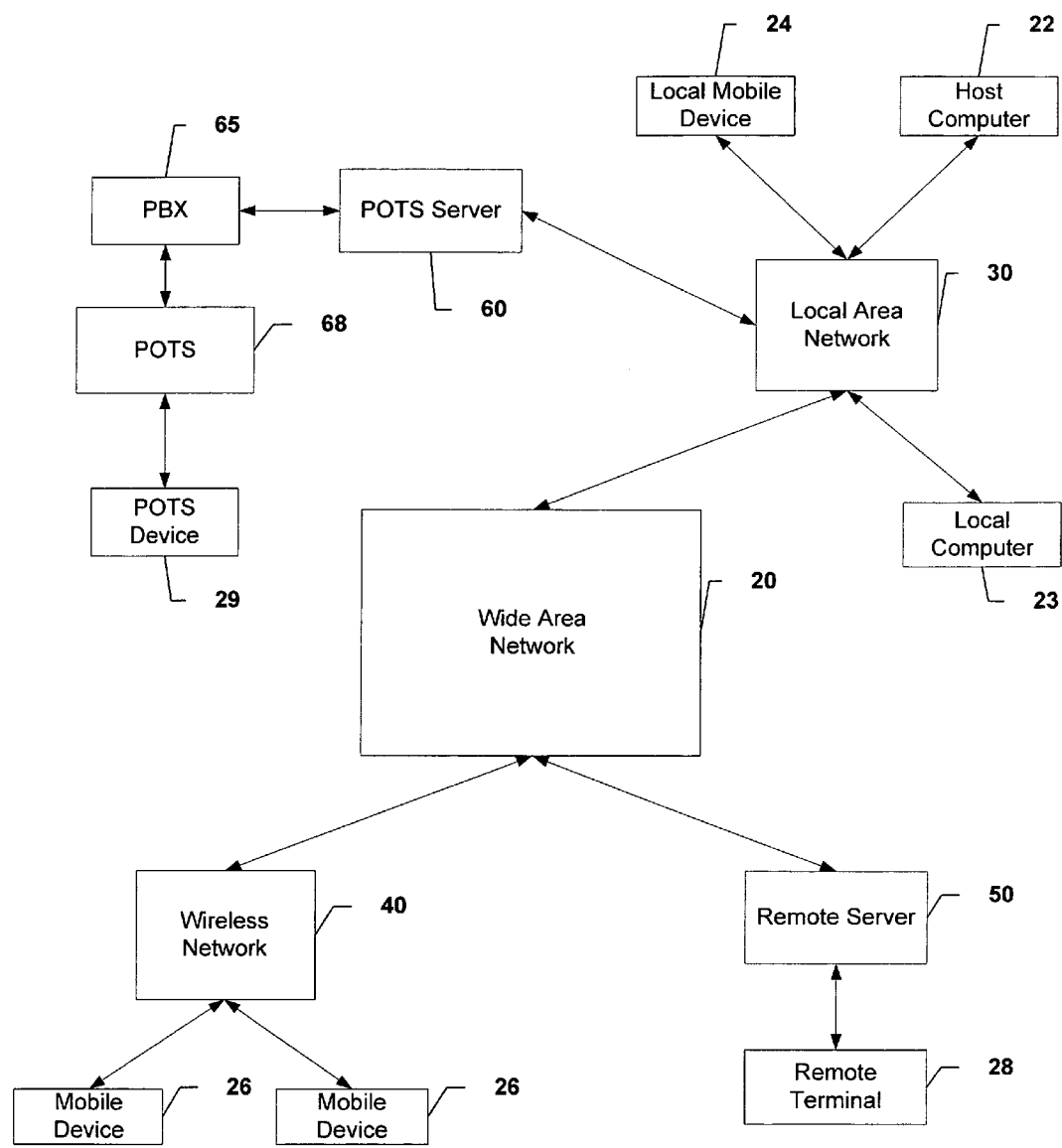
FIG. 1 is a diagram showing various components in a communications system in accordance with a preferred embodiment of the present invention.

Referring now to the drawings, FIG. 1 is a diagram showing various components in a communications system in accordance with a preferred embodiment of the present invention. A host computer 22 is linked to a local area network 30. Also linked to local area network 30 are one or more local computers 23 and one or more local mobile devices 24. Linked to local area network 30 is a POTS (Plain Old Telephone System) server that communicates with a PBX unit 65. PBX unit 65 is linked to a POTS network 68 that communicates with one or more POTS devices 29. Local area network 30 is linked to a wide area network 20. Preferably, wide area network 20 is the internet using Transmission Control Protocol/Internet Protocol to communicate information. Linked to wide area network 20 is a wireless network 40 that communicates with one or more mobile devices 26. Also linked to wide area network 20 is a remote server 50 that communicates with at least one remote terminal 28.

Mobile device 26 may be a laptop computer, personal digital assistant, cell phone, pager, point of sale terminal or other remote terminal linked to wide area network 20 via wireless network 40. Local mobile device 24 may be the same type of device as mobile device 26, but it is linked to local area network 30. Remote terminal 28 may be a desktop computer or server linked to wide area network 20 via remote server 50. POTS device 29 may be a standard telephone, answering machine or facsimile.

Figure 2:
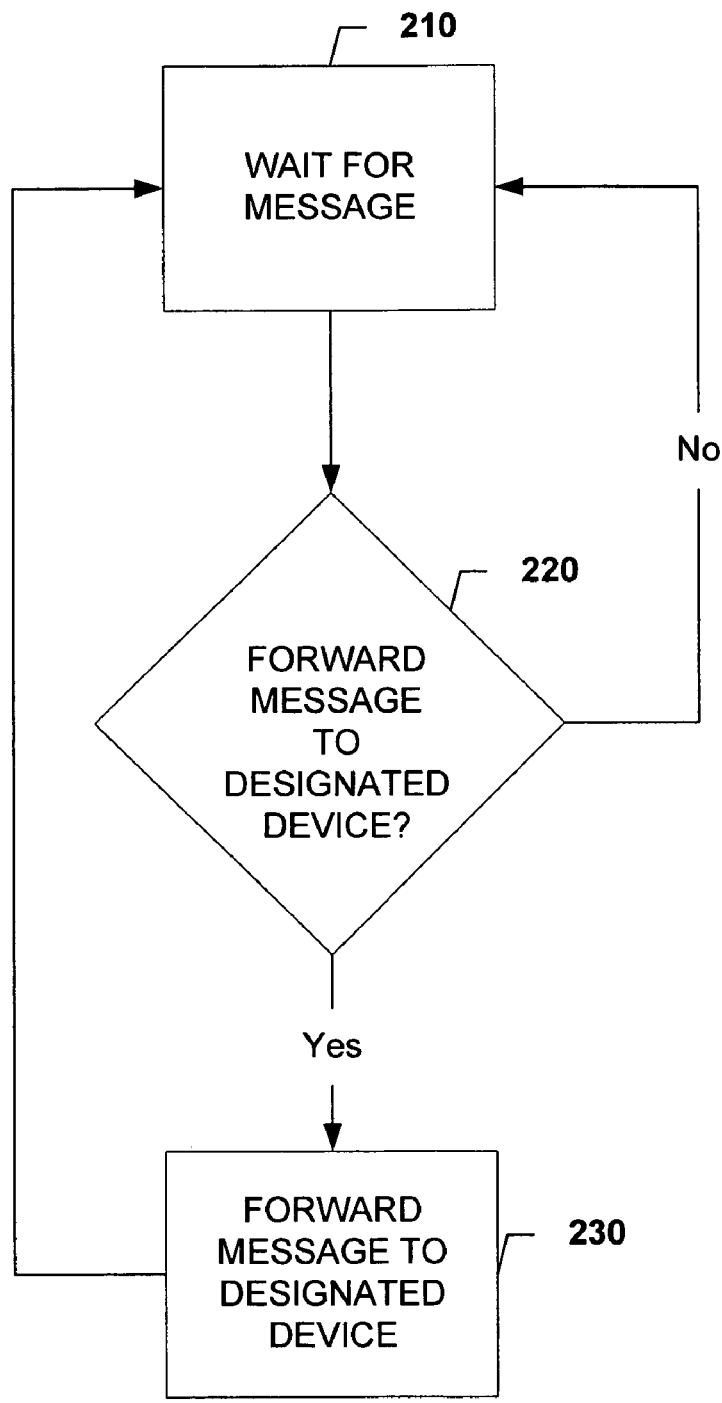
FIG. 2 is a flow chart showing steps carried out by the host computer that receives a message from a sender.

FIG. 2 sets forth a flow chart showing the steps carried by host computer 22 (FIG. 1). At 210 host computer 22 is capable of receiving a message from a sender. The message is transmitted to the host computer over wide area network 20 (FIG. 1). Alternatively, the message may be transmitted entirely within local area network 30 (FIG. 1). For example, the system may be employed within a retail store for use by store clerks tending to aisles with data computing devices linked to a local network. The type of message to be delivered may be an email message, voice mail, facsimile, notification, appointment or other electronic message. At 220, host computer 22 has access to a message-forwarding program that determines whether to forward messages sent to the host computer to one or more designated devices. The designated device may be local mobile device 24 (FIG. 1), mobile device 26 (FIG. 1), remote terminal 28 (FIG. 1) and/or POTS device 29 (FIG. 1). The message-forwarding program is set by a user or administrator to forward certain types of messages from the user's account to at least one designated devices. The determination of whether to forward a type of message may be based on the identification of the sender, the format of the message, time, date, level of urgency, keywords within the message or subject line, etc.

At 230, if a message is the type to be forwarded, host computer 22 sends a forwarded message to the address of one or more of designated devices 24, 26, 28, 29. The address of the one or more designated devices may be configured in the message-forwarding program by either the user or system administrator.

If a message is the type to be forwarded, host computer 22 sends a forwarded message to the address of one or more of designated devices 24, 26, 28, 29. The address of the one or more designated devices may be configured in the message-forwarding program by either the user or system administrator.

In one embodiment of the invention, the forwarded message comprises the message that was sent to host computer 22. In another embodiment, the forwarded message is only based on the message sent to host computer 22. The forwarded message may comprise portions of the message sent to host computer 22. By shortening the forwarded message, the message could be sent in less time, use less network resources, be easier to read by the user of the designated device and take up less memory in the designated device. In another embodiment, the forwarded message may comprise information in addition to that sent to the host computer. The forwarded message may include additional files or data for the user of the designated device. The additional files or data may be related to the message sent to host computer 22.

Repackaging software repackages the forwarded messages. Under the control of the repackaging software, the routing information for the forwarded message that appears on the designated device may be the same as the routing information that appears on the host computer or, at a minimum, is encoded into the message for direct reply by the designated device. Thus, in a preferred embodiment the designated device displays the forwarded message in accordance with the routing format shown on the host computer. For example, the "from" line of the forwarded message that appears on the designated device would be the address or other identifying information associated with the original sender of the message (not the host computer).

The repackaging software can be stored at host computer 22, the designated device or on some remote storage facility that is accessible to the host computer or designated device. In one embodiment, the designated device repackages the forwarded message after the designated device receives the message. In another embodiment, host computer 22 can perform the repackaging before the message is forwarded to the designated device and the designated device can interpret the repackaged message sent by host computer 22.

In the event the transmitted message includes formatted messages that are not acceptable to the designated device or not in an optimal format, the repackaging software can also reformat the message to meet the needs of the designated device. For example, a standard HTML page may be converted to a text page format or facsimile format if the designated device cannot read HTML code. In another preferred alternative embodiment, text messages may be converted to audio signals. The audio signals can be sent to the designated device such as a standard telephone, cellular phone or personal digital assistant having audio capability. A user can respond to the audio message by providing on the designated device commands and an audio message. The commands (e.g., reply, send, etc.) may be entered audibly and/or by keypad entries. The audio response may be sent to the original sender or the audio response may be converted to text and sent to the original sender in text format. Conversely, in the event the transmitted message includes an audio component and the user cannot (or chooses not to) accept audio messages, the audio message may be converted to text. The text can then be displayed on the designated device.

The designated device is capable of receiving the messages forwarded over the computer network from host computer 22. If the designated device is mobile device 26, the message is sent from wide area network 20 through wireless network 40. If the designated device is local mobile device 24, the message is sent within local area network 30.

If the designated device is remote terminal 28, the message is sent from wide area network 20 through remote server 50. If the designated device is POTS device 29, the message is sent through local area network 30, POTS server 60, PBX unit 65 and POTS network 68.

Figure 3:
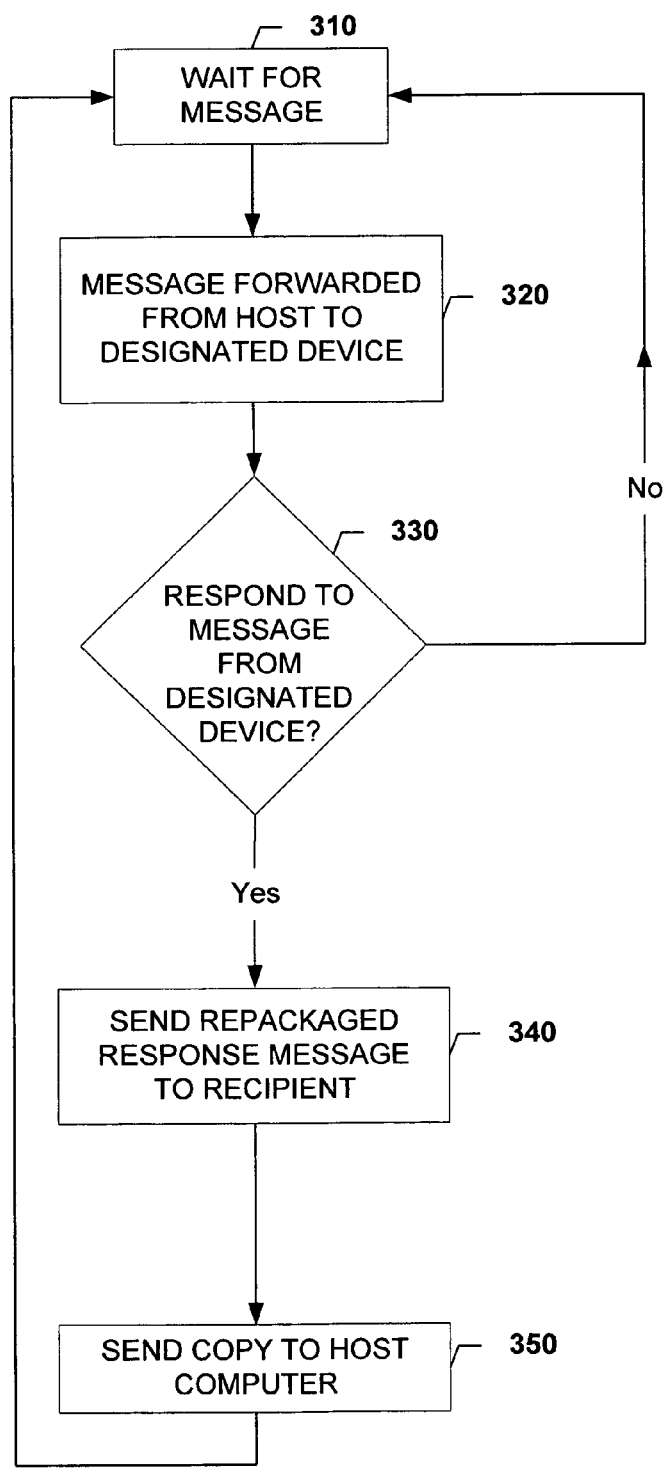
FIG. 3 is a flow chart showing steps carried out by the designated device that receives a message forwarded from the host computer to the designated device.

FIG. 3 sets forth a flow chart showing steps carried out by the designated device. At 310, the designated device is capable of responding to the forwarded messages received at 320 with a response message. The response message may be one or more of the typical responses available to a recipient of an electronic message. Specifically, the user may reply to the sender, "reply to all", forward the message, utilize information from the message for another application (e.g., an appointment program), etc. At 330, if the user sends a reply or forwarding message, the user may include a carbon copy ("cc") or blind carbon copy ("bcc") of the message to one or more other recipients. All recipients of a message can see that a carbon copy was sent. Only the sender and the blind carbon copy recipient know that a blind carbon copy was sent.

The designated device does not have to redirect the response message to the host computer. At 340, the response message is sent from the designated device to the recipient without any interaction from host computer 22. The response message may be packaged as though it was sent directly from host computer 22 to the recipient.

In addition to sending the response message to the recipient, a copy message may be sent to host computer 22. Preferably, at 350, the designated device sends the copy message to host computer 22. The communication of the copy message from the designated device to host computer 22 is preferably transparent to the recipient. In a preferred embodiment of the invention the copy message can be sent from the designated device to host computer 22 in a blind carbon copy format. That is, the copy message may be sent from the designated device to host computer 22 at the same time the response message is sent to the recipient, but the recipient cannot tell that the copy message is being sent to host computer 22.

In another embodiment, the copy message is not sent to host computer 22 at the same time the response message is sent to the recipients. Due to bandwidth constraints on the computer network, it may be advantageous to delay communicating the copy message to host computer 22. The system may delay transferring the copy message to host computer 22 until the user actively requests the transfer. Alternatively, the system may monitor network traffic and may automatically transfer the copy message at a time when the network conditions improve. The system may also automatically transfer the copy message at a time when the network normally has less traffic.

Figure 4:
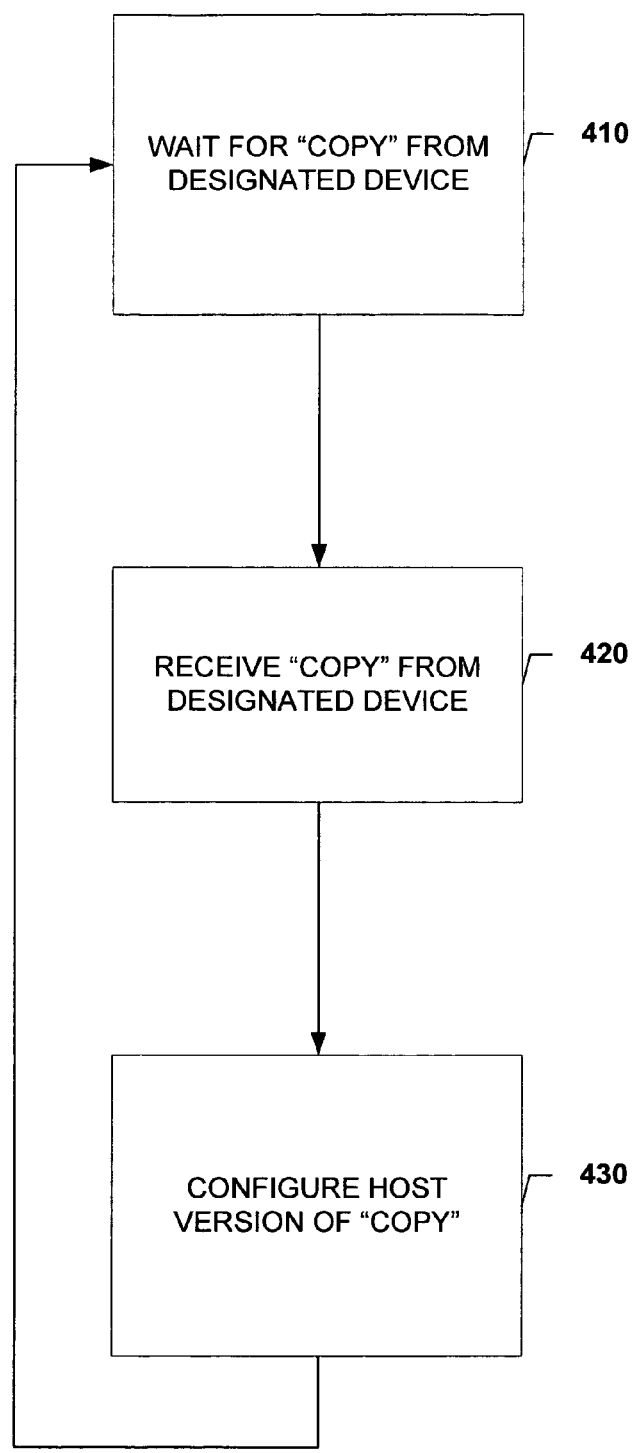
FIG. 4 is a flow chart showing steps carried out by the host computer that receives a copy of the message sent to a recipient from the designated device.

FIG. 4 sets forth a flow chart showing steps carried out by host computer 22. At 410, host computer 22 is capable of receiving the copy message from the designated device. At 420, the copy message received by host computer 22 may be packaged at 430 as though the message was sent directly from host computer 22 to the recipient's computer. For example, the "to" line of the copy message received by host computer 22 may be repackaged to indicate that the message was sent to the recipient's computer (instead of host computer 22). FIG. 4 shows an embodiment where host computer 22 repackages the copy message after host computer 22 receives the copy message. In an alternative embodiment, the designated device could perform the repackaging before the copy message is sent to host computer 22 and host computer 22 interprets the repackaged copy sent by the designated device.

A messaging program may track the systems incoming and outgoing messages. The messaging program may generate a list of the systems incoming messages and a list of the outgoing messages. Both the host computer and the designated device may have a copy of the messaging program or a copy of a portion of the messaging program. Alternatively, the designated device and the host computer could share the same messaging program, which could be stored at the host computer, the designated device or some remote storage facility.

The list of outgoing messages from the host computer may include messages sent from the designated device as though the messages were sent from the host computer. The messaging program may include an option to segregate the outgoing messages into those sent from the host computer and those sent from the designated device. The messaging program may have an option to omit or to include from the list of outgoing messages the forwarded messages sent from the host computer to the designated device.

Similarly, the list of outgoing messages from the designated device may include messages sent from both the host computer and the designated device. The messaging program could include an option to segregate the outgoing messages into those sent from the host computer and those sent from the designated device. The messaging program may have an option to omit or to include from the list of outgoing messages the copy messages sent from the designated device to the host computer. The messaging program may have an option to omit or to include from the list of incoming messages the forwarded messages from the host computer to the designated device. In the event the user employs the system in an environment with more than one host computer (e.g., a work computer and a home computer), in one of the preferred embodiments, the user can list the incoming messages that were sent to a specific one of the host computers.

The herein described embodiments of the present invention are intended to provide the preferred embodiments of the present inventions currently contemplated by the applicant. It would be obvious to any one of skill in the relevant art, based on the herein described examples that numerous modifications could be made to the described preferred embodiments without straying from the present invention. Accordingly, the herein described embodiments are merely exemplary in nature and are not intended to represent every possible embodiment of the present invention.

I claim:

1. A method for replying to a message from a designated device in an automated messaging system, the message being sent by a sender to an address associated with a host computer, said method comprising the steps of:
   a) configuring the host computer to forward messages to an address associated with the designated device;
   b) sending a forwarded message from the host computer to said address associated with the designated device, said forwarded message being associated with the message sent to the address associated with the host computer;
   c) receiving the forwarded message on the designated device;
   d) sending a reply message from the designated device to the sender, wherein the reply message includes originating information and wherein the originating information of the reply message is configured using information associated with the host computer; and e) sending a copy message from the designated device to the address associated with the host computer, said copy message being associated with the reply message.

2. The method of claim 1 wherein the copy message includes recipient information and wherein the recipient information of the copy message is configured using information associated with the sender.

3. The method of claim 1 wherein the forwarded message includes originating information and wherein the originating information of the forwarded message is configured using information associated with sender.

4. The method of claim 1 wherein the message sent to the address associated with the host computer is in a first file format and wherein the forwarded message is in a second file format, and wherein the method further comprises converting the first file format to the second file format.

5. The method of claim 4 wherein the first file format is primarily a text format and wherein the second file format is primarily an audio format.

6. The method of claim 4 wherein the first file format is primarily an audio format and wherein the second file format is primarily a text format.

7. The method of claim 1 wherein the sending of the copy message to the address associated with the host computer is not noticeable by the sender.

8. The method of claim 1 wherein the copy message is sent to the address associated with the host computer in a blind carbon copy format.

9. The method of claim 1 wherein the host computer only forwards messages of a certain type to the designated device.

10. The method of claim 1 wherein the designated device is a mobile device.

11. The method of claim 1 wherein the message sent to the address associated with the host computer is an email message.

12. The method of claim 1 wherein the reply message is an email message.

13. A method for responding to a message sent to an address associated with a host computer in an automated messaging system, said method comprising the steps of:
   a) configuring the host computer to forward messages to an address associated with a designated device;
   b) sending a forwarded message from the host computer to said address associated with the designated device, said forwarded message being associated with the message sent to the address associated with the host computer;
   c) receiving the forwarded message on the designated device;
   d) sending a response message from the designated device to a recipient address, wherein the response message includes originating information and wherein the originating information of the response message is configured using information associated with the host computer and wherein the recipient address is not the address associated with the host computer; and
   e) sending a copy message from the designated device to the address associated with the host computer, said copy message being associated with the response message.

14. The method of claim 13 wherein the copy message includes recipient information and wherein the recipient information of the copy message is configured using information associated with the recipient address.

15. The method of claim 13 wherein the forwarded message includes originating information and wherein the originating information of the forwarded message is configured using information associated with sender.

16. An automated electronic messaging system for responding to a message sent from a sender to an address associated with a host computer, the sender being associated with a sender address, said system comprising:
   a) a designated device, said designated device being associated with a designated device address;
   b) a message-forwarding agent for sending a forwarded message from said host computer to said designated device address, said forwarded message being associated with the message sent to the address associated with the host computer;
   c) a response message agent for sending a response message from said designated device to the sender address, wherein the response message includes originating information and wherein the originating information of the response message is configured using information associated with the host computer; and
   d) a copy agent for sending a copy message from said designated device to the address associated with the host computer, said copy message being associated with the response message.

17. The system of claim 16 wherein the copy message includes recipient information and wherein the recipient information of the copy message is configured using information associated with the sender.

18. The system of claim 16 wherein the forwarded message includes originating information and wherein the originating information of the forwarded message is configured using information associated with sender.

19. The system of claim 16 wherein the message sent to the address associated with the host computer is in a first file format and wherein the forwarded message is in a second file format, and wherein the system further comprises a formatting agent for converting the first file format to the second file format.

20. The system of claim 19 wherein the first file format is primarily a text format and wherein the second file format is primarily an audio format.

21. The system of claim 19 wherein the first file format is primarily an audio format and wherein the second file format is primarily a text format.

22. The system of claim 16 wherein the sending of the copy message to the address associated with the host computer is not noticeable by the sender.

23. The system of claim 16 wherein the host computer only forwards messages of a certain type to the designated device.

24. The system of claim 16 wherein the designated device is a mobile device.

25. The system of claim 16 wherein the message sent to the address associated with the host computer is an email message.

26. The method of claim 16 wherein the response message is an email message.

27. A method for providing a response message from a designated device in an automated messaging system, said method comprising the steps of:
   a) receiving on a host computer a message sent to an address associated with the host computer, the message being sent from a sender, the sender being associated with a sender address;
   b) sending a forwarded message from the host computer to an address associated with the designated device, said forwarded message being associated with the message sent to the address associated with the host computer;

c) receiving the forwarded message on the designated device;

d) sending a reply message from the designated device to the sender address, wherein the reply message is configured using the address associated with the host computer;

e) sending a copy message from the designated device to the address associated with the host computer, said copy message being associated with the reply message;

f) receiving the copy message on the host computer.

28. The method of claim 27 wherein the copy message includes recipient information and wherein the recipient information of the copy message is configured using information associated with the sender.

29. The method of claim 27 wherein the forwarded message includes originating information and wherein the originating information of the forwarded message is configured using information associated with sender.

30. The method of claim 27 wherein the message sent to the address associated with the host computer is in a first file format and wherein the forwarded message is in a second file format, and wherein the method further comprises converting the first file format to the second file format.

31. The method of claim 30 wherein the first file format is primarily a text format and wherein the second file format is primarily an audio format.

32. The method of claim 30 wherein the first file format is primarily an audio format and wherein the second file format is primarily a text format.

33. The method of claim 27 wherein the sending of the copy message to the address associated with the host computer is not noticeable by the sender.

34. An automated electronic messaging system for responding to a message sent from a sender to an address associated with a host computer, the sender being associated with a sender address, said system comprising:

a) a designated device, said designated device being associated with a designated device address;

b) a message-formatting agent for converting the message to a reformatted message, said reformatted message can be processed by the designated device;

c) a message-forwarding agent for sending the reformatted message from said host computer to said designated device address; and d) an agent for sending i) a response message from said designated device to the sender address, wherein the response message includes originating information and wherein the originating information is configured using information associated with the host computer and ii) a copy message from said designated device to the address associated with the host computer, said copy message being associated with the response message.

35. The system of claim 34 wherein the copy message includes recipient information and wherein the recipient information of the copy message is configured using information associated with the sender.

36. The system of claim 34 wherein the reformatted message includes originating information and wherein the originating information of the reformatted message is configured using information associated with sender.

37. The system of claim 34 wherein the message is in a first file format and wherein the reformatted message is in a second file format, and wherein the message-formatting agent converts the first file format to the second file format.

38. The system of claim 37 wherein the first file format is primarily a text format and wherein the second file format is primarily an audio format.

39. The system of claim 37 wherein the first file format is primarily an audio format and wherein the second file format is primarily a text format.

40. The system of claim 37 wherein the sending of the copy message to the address associated with the host computer is not noticeable by the sender.

41. The system of claim 37 wherein the host computer only forwards messages of a certain type to the designated device.

42. The system of claim 37 wherein the designated device is a mobile device.

43. The system of claim 37 wherein the message sent to the address associated with the host computer is an email message.

44. The method of claim 37 wherein the response message is an email message.

* * * * *